United States Patent [19]

Rentschler

[11] Patent Number: 4,743,933

[45] Date of Patent: May 10, 1988

[54] CAMERA AND METHOD FOR TAKING FLASH PHOTOGRAPHS USING AN ELECTRONIC FLASH

[75] Inventor: Waldemar Rentschler, Wildbad, Fed. Rep. of Germany

[73] Assignee: Prontor-Werk, Alfred Gauthier GmbH, Wildbad Im Schwarzwald, Fed. Rep. of Germany

[21] Appl. No.: 463,583

[22] Filed: Feb. 3, 1983

Related U.S. Application Data

[63] Continuation of Ser. No. 273,011, Jun. 12, 1981, abandoned, which is a continuation of Ser. No. 51,786, Jun. 25, 1979, abandoned.

[30] Foreign Application Priority Data

Jun. 24, 1978 [DE] Fed. Rep. of Germany ....... 2827811

[51] Int. Cl.$^4$ ............................................. G03B 15/03
[52] U.S. Cl. ...................................... 354/422; 354/441
[58] Field of Search ................... 354/36, 38, 234, 420, 354/422, 441

[56] References Cited

U.S. PATENT DOCUMENTS

| | | | |
|---|---|---|---|
| 3,460,451 | 8/1969 | Starp et al. | 354/51 |
| 3,518,927 | 7/1970 | Mehlitz et al. | 354/30 |
| 3,526,180 | 9/1970 | Fahlenberg et al. | 354/269 |
| 3,533,347 | 10/1970 | Auguste et al. | 354/37 |
| 3,635,142 | 1/1972 | Ataka et al. | 354/234 |
| 3,747,495 | 7/1973 | Tenhumo et al. | 354/234 |
| 4,166,685 | 9/1979 | Hashimoto | 354/236 X |

Primary Examiner—Russell E. Adams
Attorney, Agent, or Firm—George W. MacDonald, Jr.

[57] ABSTRACT

A camera, such as a single lens reflex camera, having a focal plane shutter and an interchangeable lens incorporating a diaphragm system, and provided with a control system for taking photographs using an electronic flash, in which the diaphragm system may be operated as an opening and closing shutter system as well as for providing the working aperture upon moving the focal plane shutter to fully open position to expose the film window, such that when the focal plane shutter release button is actuated, the focal plane shutter is moved to fully open position, and under the influence of the control system, the opening and closing system opens the aperture to a preselected width for a brief interval, e.g. 1/125 sec. or shorter, and the ignition of the flash is synchronized with the achievement of the preselected aperture, whereby to take a flash photograph during such brief interval and while the focal plane shutter remains throughout in fully open position, and a method for taking a flash photograph using a camera of the foregoing type.

16 Claims, 3 Drawing Sheets

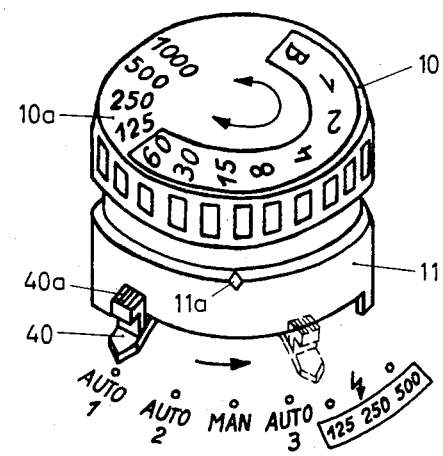
Fig. 5
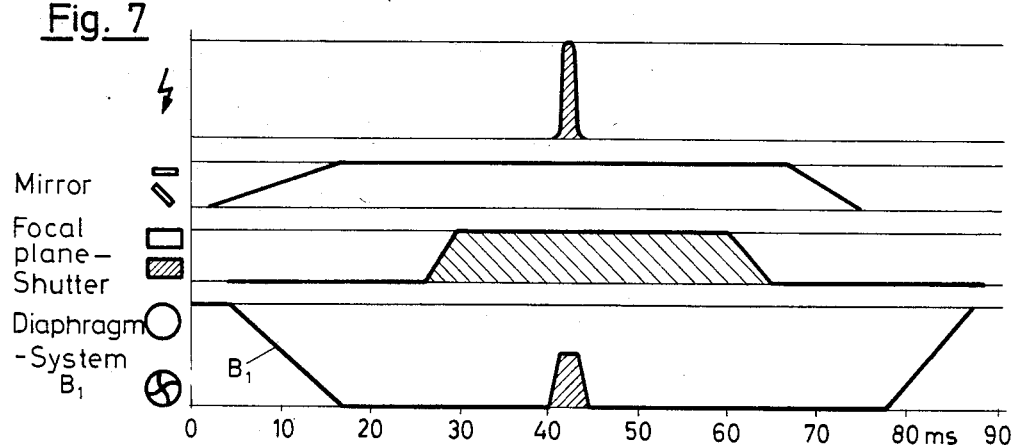
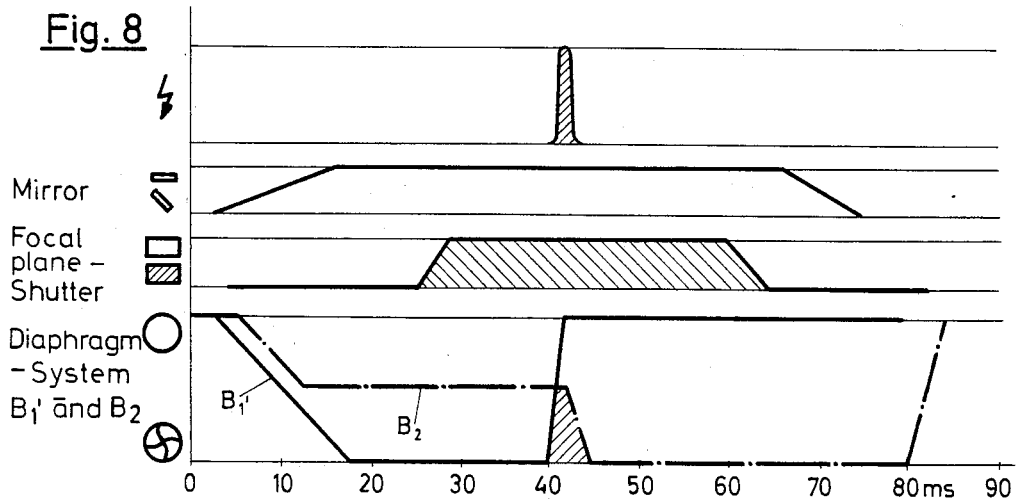

CAMERA AND METHOD FOR TAKING FLASH PHOTOGRAPHS USING AN ELECTRONIC FLASH

This is a continuation of copending application Ser. No. 273,011 filed June 12, 1981 which is a continuation in turn of copending application Ser. No. 51,786 filed June 25, 1979, both now abandoned.

The present invention concerns a camera and a method for taking flash photographs under controlled conditions using an electronic flash, wherein the camera, such as a single lens reflex camera, is fitted with a focal plane shutter and also with a lens assembly incorporating an aperture forming diaphragm system capable of functioning as a shutter system when the focal plane shutter is maintained in open position.

In the case of focal plane shutter cameras of the type in question, the shutter system normally contemplates a pair of focal plane curtains or blade slide portions movable in adjustably timed sequence across the adjacent film window thereat. In this regard, the trailing edge of the first or opening curtain or slide portion of the shutter progressively uncovers the film window to expose the film material thereat incrementally, while the leading edge of the second or closing curtain or slide portion of the shutter, which follows the first portion in turn progressively recovers the film window to close off the film material thereat from exposure concordently incrementally. The first curtain may be moved to fully open position for a selective time interval before the second curtain is actuated to reclose the film window, or the second curtain can be actuated to initiate the closing operation before the first curtain has completed the the opening operation, depending on the adjustment selected.

When using such a focal plane shutter camera, for example, a small sized 35 mm single lens reflex camera (SLR camera), the shortest exposure time, i.e. within the limits of the particular camera design and construction, in which electronic flash synchronization is still possible, during the exposure process, is generally only between 1/50 sec. and 1/125 sec. In the case of the usual medium sized focal plane shutter SLR camera, because of design consideration and especially the larger masses in the shutter system which must be moved, the synchronization time for photograph using an electronic flash can in no case be shorter than 1/60 sec.

In this regard, with conventional focal plane shutter cameras, the shortest usable electronic flash synchronization time for correspondingly short exposures as is well known, is determined by the fact that for proper results, the film window of the camera, in the taking of flash photographs, has to be completely uncovered at least for a brief moment by the focal plane shutter for the flash light to be effective—more specifically, the first or opening curtain or slide portion of the shutter must have completely travelled its uncovering path across the film window before the second or closing curtain or slide portion comes into the area of the window, and during this time the flash ignition must occur. Otherwise, the instantaneous flash light will only act on that portion of the film material exposed at this time, leaving the remainder of the film material in the partially covered over film window still unexposed.

One of the greatest disadvantages associated even today with modern focal plane shutter cameras is this inherently limiting condition, which is an essential factor for taking flash photographs. This is evidenced by the fact that, with relatively long synchronization limiting exposure times of the order of magnitude generally usable with focal plane shutter type cameras, the intensity of the light in the area to be photographed also determines the nature of the exposure to a certain extent, so that moving objects, which also include persons, lead to resultant blurred images in the photographs taken. It is precisely this result which is avoided by the use of an electronic flash which has a very short effective flash time, i.e. generally shorter than 1/1000 of a sec, but as aforesaid this is not possible to achieve with focal plane shutter type cameras.

In an attempt to overcome such underlying drawback of focal plane shutter type cameras, great efforts have been expended over the years. However, these have all led to unsatisfactory results, and also to the fundamental recognition that there are relatively narrow operational limits within which all such efforts to obtain improvements in the taking of photographs with an electronic flash must be confined.

Thus, for example, special lenses with an additional fitted central shutter have been provided for focal plane shutter cameras, or an additional central shutter located in front of the lens of the basic focal plane shutter camera. Apart from the high costs resulting from the equipping of a camera with such an additional shutter, very special conditions of a functional and operating nature also have to be fulfilled, since practical results of the exposure can only be achieved by the establishment of an exact or concordant "trigger connection" between the focal plane and central shutters for conjoint operation during the brief moment when the flash ignition takes place.

Furthermore, a limitation of the performance characteristics of the lens has to be accepted when a focal plane shutter type camera is equipped in this manner because, in employing a central shutter, the same light intensity and focusing widths are not immediately possible, as in the case of a normal lens which may be employed without the use of such an additional shutter.

Apart from such additional central shutter feature, attempts have been made time and again to obtain better results in taking electronic flash exposures with focal plane shutter cameras, by way of increasing the operating speed of focal plane shutters themselves. However, the shortest time possible which can be achieved in this manner is always conditioned upon the essential limitation or requirement that both curtains or slides of the focal plane shutter fully expose the film window during the exact moment when the electronic flash is ignited.

Despite resort to vertically operating shutter curtains, i.e. operation of the curtains over or across the shorter distance corresponding to the lesser linear dimension of the short side of the film window, which is normally of oblong rectangular shape, it has not been possible, mechanically or structurally, even with 35 mm SLR cameras, to achieve a shorter electronic flash synchronization time than 1/125 sec. in this manner. Specifically, the shutter system masses to be moved, in conjunction with the paths to be travelled thereby are simply too great, taking into consideration the possible maximum spring tensions, spring life and resultant vibrations of the moving parts, to change substantially the above-mentioned shutter time limit whereby to reduce it.

In the prevailing circumstances, an improvement by a a factor of 2 would appear to be necessary before it might be regarded as an important or unusual improvement, i.e. the achieving of a limiting synchronization time reduced from between 1/60 and 1/124 sec. to at least between 1/125 and 1/250 sec. In 35 mm focal plane shutter cameras. Nevertheless, for the above discussed reasons, it has not been possible up to the present to obtain synchronization times of such short duration in practice, i.e. within which the focal plane shutter is able to move to fully open position, the flash thereafter ignited, and the closure of the shutter thereafter initiated.

It is among the objects and advantages of the present invention to overcome the above mentioned drawbacks and deficiencies of the prior art, and to provide a focal plane shutter camera of the stated type which makes it possible, without appreciable additional expenditure or construction, to take flash photographs, reliably under selectively controlled conditions with the use of an electronic flash device, with significantly shorter exposure times than have been possible to obtain heretofore with conventional focal plane shutter cameras.

Other and further objects and advantages of the present invention will become apparent from a study of the within specification and accompanying drawings, in which:

FIGS. 4a and 4b are schematic views analogous to FIG. 4 of respective alternative arrangements of two counterpart diaphragm blade sub-systems actuatable independently of each other;

FIG. 5 is a schematic enlarged view of a special embodiment of a setting knob system corresponding to that shown in FIG. 1 for selecting a specific mode of operation and which includes a setting member which is adjustable not only to the setting positions "AUTO 1", "AUTO 2", "MAN" and "FLASH" or "$\sharp$" but also to an additional flash assisted setting position "AUTO 3";

Figure 1:
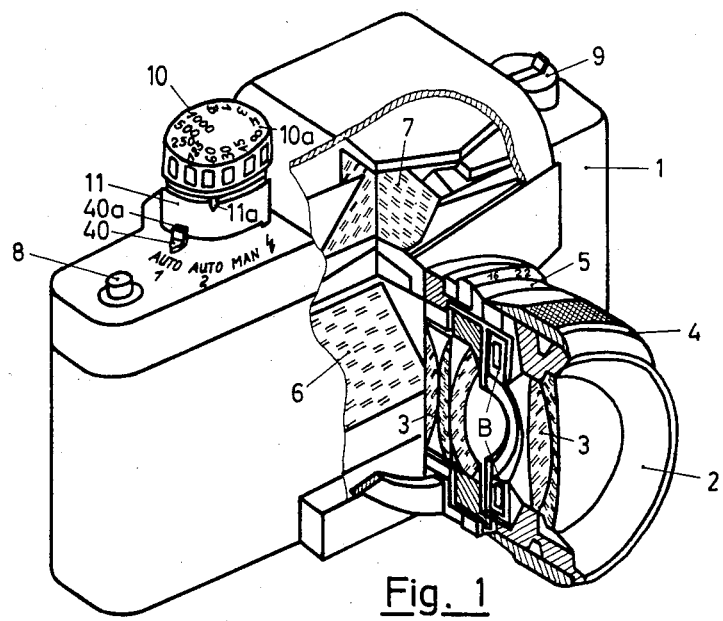
FIG. 1 is a schematic perspective view, partially broken away, which shows a single lens mirror reflect camera having an interchangeable lens assembly indicated in cross-section.

FIG. 7 is a schematic view of the "electronic flash function operating diagram" of a focal plane shutter camera, the lens diaphragm system of which comprises only a single oscillating blade system $B_1$, with the time indicated on the abscissa in milliseconds (ms) and the ordinate showing the relative disposition or movement ratios of the diaphragm system, focal plane shutter and mirror, and also the amount of illumination of the electronic flash; and FIG. 8 is a schematic view of another "electronic flash function operating diagram" of a focal plane shutter camera, analogous to that shown in FIG. 7, the lens diaphragm system of which is formed of two counterpart blade sub-systems $B_1'$ and $B_2$ actuated independently of each other.

According to the present invention, a camera and method are provided for taking photographs using an electronic flash under controlled conditions, in which the camera, and particularly a single lens reflex camera, is fitted with a focal plane shutter and also with a lens assembly incorporating an aperture forming diaphragm system. Hence, when taking photographs using an electronic flash also included on the camera after complete exposure of the film window by moving the focal plane shutter on the camera to completely open position, an opening and closing blade system fitted in the lens assembly and exercising the function of a diaphragm and also of a lens shutter, comes into action under the influence of control means and opens up the lens aperture for exposing the film material for a brief interval of time with a preselected diaphragm aperture width or size whereupon the electronic flash also under the influence of such control means is ignited synchronously with the achievement of the formation of the working diaphragm aperture and while the focal plane shutter continues to remain in fully open position.

With the use of the control means according to the present invention, together with the use of the blade system, normally already present in the lens assembly, e.g. of single lens reflex type cameras, and hitherto used only for exercising a diaphragm function, a camera construction and method are advantageously provided for the first time which, while avoiding any harmful influence on the result of the exposure by the action of the focal plane shutter on the camera, allow for the taking of photographs with a electronic flash at exposure times of less than 1/125 sec.

Thus, electronic flash photographs with a desired significantly short exposure time are obtainable according to the present invention under selectively controlled conditions with a diaphragm shutter incorporated in the lens assembly. Such short or shortest "synchronization time" may for instance be of the order of magnitude of 1/500 sec. with a suitable arrangement of the opening and closing diaphragm system.

A focal plane shutter camera construction operating according to the present invention therefore has all the advantages which are associated with conventional focal plane shutter cameras with respect to the taking of daylight photographs with very short exposure times, down to 1/2000 sec, for instance, and the use of wide spectrum of very efficient lenses (i.e. as regard focal length and light intensity). In addition to this, it has the special advantage of taking electronic flash photographs according to the instant invention with any desired exposure time, right down to the shortest achievable exposure time obtainable in practice, accomplishing such results by means of the selectively controlled opening and closing diaphragm system already present in the lens assembly in conjunction with the control means herein provided.

The constructional arrangement and method of the present invention may be optimally achieved with relatively little mechanical sophistication and with a maximum of control flexibility in a simple manner, such as by fitting the opening and closing diaphragm system associated with the lens assembly with a controllable conventional electrodynamic drive. This type of drive insures a very reliable movement of the opening and closing blade members, and provides the further advantage that the movement of the operating parts may be effected at different selected speeds in dependence upon the chosen operating program. Yet another advantage of this type of drive resides in the fact that it is free from the disadvantages associated with the operation of a purely mechanical spring motor or the like as regards such factors as length of life and mechanical power transmission arrangement, and at the same time allows very flexible operation to be achieved.

In order to carry into practice the constructional combination and method of the present invention, the opening and closing diaphragm system on the lens assembly may be suitably formed either of a single oscillating blade system or of two separate counterpart blade system, or more precisely sub-systems, actuated independently of each other, one of which is used for opening initially the diaphragm aperture and the other for preforming the working diaphragm apertures and for closing such aperture at the end of the short exposure time contemplated.

In opening and closing systems of the above type, it is an advantage that they are very suitable for performing shutter functions of a special automatic exposure system as known from lens shutter cameras generally, a feature which can prove to be advantageous, particularly in taking flash contemplated daylight photographs with the use of the so-called "flash fill-in technique" or flash assisted ambient light type photography. An embodiment of the arrangement of the present invention using two separate counterpart blade systems or sub-systems gives the further advantage of providing a very short limiting electronic flash synchronization time.

On the basis of a focal plane shutter camera which, apart from having a special setting position for taking photographs when using an electronic flash, also contemplates a plurality of automatic exposure selecting possibilities (e.g. automatic shutter speed timing with diaphragm aperture size preselection, and automatic diaphragm aperture size formation with shutter speed time preselection) and a manual setting range, there is advantageously provided according to the present invention a setting selector means in order to insure clear, simple and reliable manipulation for preselecting the desired type of operation.

Such selector means may suitably be provided with a special setting position, e.g. "FLASH" or "$\not$", for the taking of electronic flash photographs according to the present invention. In the adjustment of the selector means to such special setting position, the exposure of the film material is suitably effected by the opening and closing system associated with the lens assembly and simultaneously exercising the diaphragm function, after the exposure of the film window by the earlier opening movement of the focal plane shutter on the camera. The actual exposure of the film material to light entering through the lens opening, e.g. flash light, in this manner, can thereby be effected for an advantageously short exposure time, for example of only 1/200 sec.

The selector means may also have a plurality of "AUTO" setting positions provided for use in taking daylight photographs in the usual way and a setting position "MAN" in which the electrodynamically driven opening and closing system advantageously provided on the lens assembly merely produces the working diaphragm aperture, with the exposure of the film material being effected simply by normal operation of the focal plane shutter itself on the camera.

It is also contemplated in accordance with a preferred feature herein that the setting position "FLASH" or "$\not$" for taking electronic flash photographs, be in turn divided into several setting sub-positions, each associated with a specific short predetermined exposure time, for example 1/125 sec, 1/250 sec. and 1/500 sec. Thus, the photographer for the first time has the afforded possibility in accordance with the control system of the present invention of selecting the arrangement of the picture to be taken at short and very short pre-selectable exposure times while using an electronic flash device with a, heretofore functionally and structurally limited, focal plane shutter type camera.

To complete the extensive range of applications of a camera arrangement according to the present invention, both in the daylight and in the flash range, it is also contemplated herein that the selector means for the mode of operation have, in addition to the "AUTO" setting positions for daylight photographs, the "FLASH" or "$\not$" setting positions and the position "MAN", a further "AUTO" setting position in which, after the complete exposure of the film window by the focal plane shutter, as aforesaid, flash assisted daylight or ambient light photographs may be taken with automatic timing and flash synchronization by means of the opening and closing system associated with the lens, even with the shortest practicable exposure times, such as 1/250 sec or 1/500 sec, for "flash fill-in technique or flash complemented photography, i.e. for using the flash light particularly for brightening shaded parts of the area being photographed.

With reference to the drawings, and initially to FIG. 1, a single lens mirror reflex camera 1 for taking flash photographs using an electronic flash is shown, which is conventionally fitted with a focal plane shutter at the film window, and which accommodates an interchangeable lens assembly 2 attachable to the camera, in conventional manner, for example, by means of a bayonet-type holder (not shown). Lens assembly 2 is provided with a controllable diaphragm system, generally indicated by B in FIG. 1, for permitting light to pass through the lens opening for exposing film material located at the film window in the camera when the focal plane shutter is moved from closed to fully open position.

It will be appreciated that it is unnecessary to deal with details of the inter-changeable lens assembly 2 other than those shown in FIG. 1, since its construction, apart from the special features of the controllable built-in diaphragm system B, is of conventional type. Thus, the interchangeable lens assembly 2 has, apart from the lens elements 3, a setting ring 4, for focusing and distance adjustment, and another setting ring 5 for manually presetting the opening width or aperture size of the diaphragm system B.

Within the camera body are located the usually arranged swing mirror 6, prismatic view-finder 7, shutter release button 8 and film rewinding crank 9, as well as an exposure time setting knob 10 for the focal plane shutter.

The electronic flash, focal plane shutter and film window at which the film material is located for exposure under controlled conditions to ambient and/or flash light entering through the lens opening, are well known elements. However, these elements and the diaphragm system in the lens assembly are operated under controlled conditions in accordance with the constructional arrangement of the drive systems of the present invention, utilizing control means in coacting association therewith as more clearly indicated hereinafter.

Figure 6:
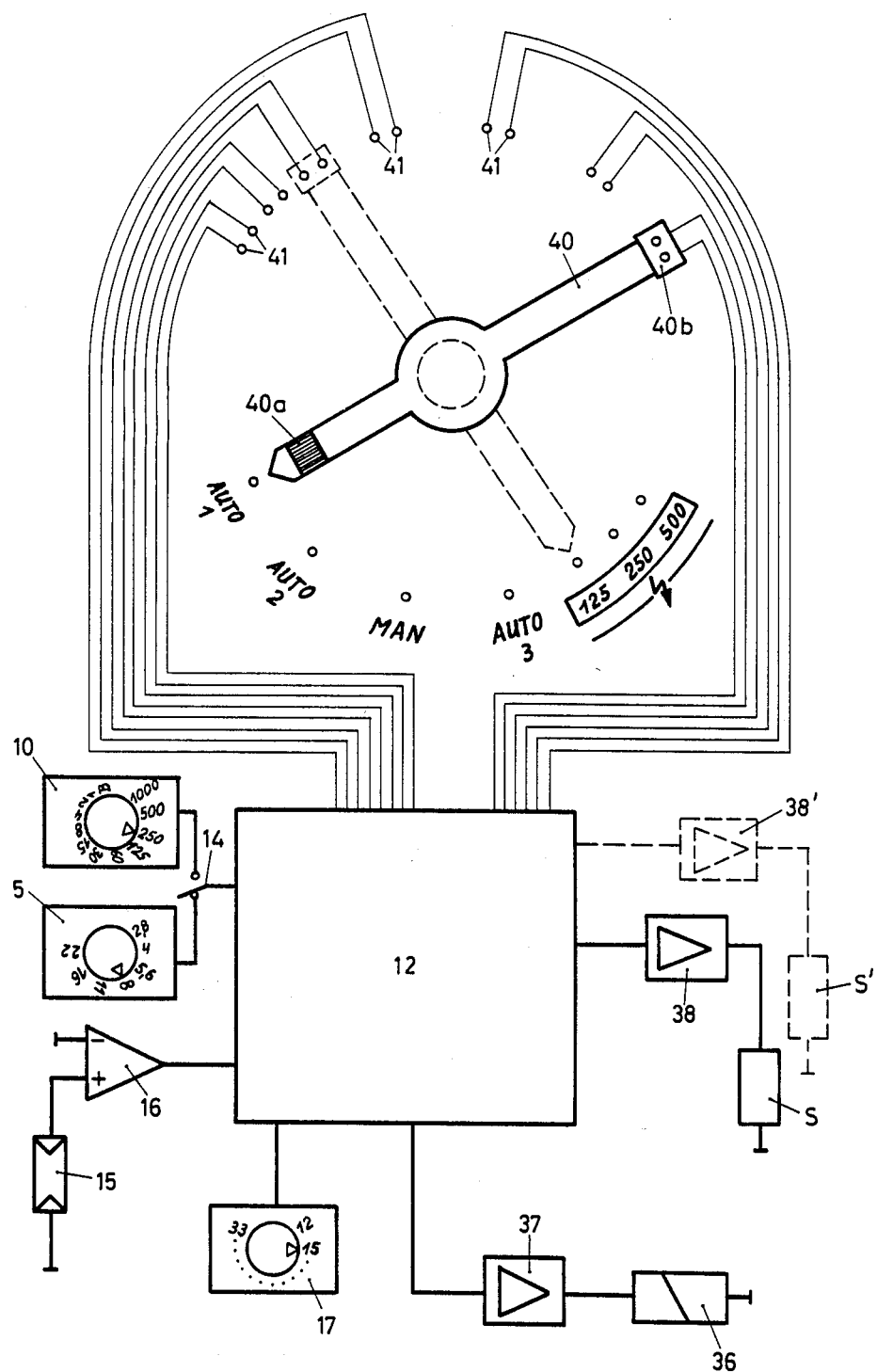
FIG. 6 is a schematic view of a block circuit diagram of a control circuit comprising a microcomputer, including the displaceable setting member of a mode of operation selector system adjustable to different setting positions.

In this regard, the focal plane shutter time setting knob 10, bearing the time scale 10a, is adjustable relative to a mark 11a formed on a stationary cylindrical casing 11, and constitutes adjustment means which cooperate with an adjustable electronic control circuit 12a, shown in the block circuit diagram according to FIG. 6, which is incorporated in the camera in the usual way and suitably energized by a power pack (not shown) such as one or more dry cells. The control circuit includes a microprocessor 12 and automatically regulates, in known manner, the operating speed of the focal plane shutter on the camera according to the preselected time value determined by knob 10 when the shutter release button 8 is pressed.

Similarly to the time setting knob 10, an aperture setting ring 5, journalled to rotate in the lens assembly 2, also has a setting scale 5a and serves as corresponding adjustment means for the manual preselection of the aperture width or working diaphragm aperture size, whereby to determine the quantity or magnitude of the exposure light entering the lens opening during the exposure time.

Since the camera is intended to give the user, as will be described in greater detail hereinafter, a possibility of pre-selecting the shutter speed exposure time with an automatic formation of the aperture size, or of preselecting the aperture size with automatic shutter speed timing, a changeover switch 14 is associated in the control circuit with the setting devices 5 and 10. Accordingly, the manually preselected exposure parameter as provided by either device 5 or device 10, as the case may be, as appropriate adjustment means, when taking daylight photographs, is fed via the switch 14, into the electronic control circuit of microcomputer 12 for evaluation and consideration in the usual way for determining the remaining exposure parameter.

For exposure time and aperture setting by means of the already mentioned setting devices, it is of course, immaterial whether, as shown in FIG. 1, the particular setting scale is provided on a rotatable member and is to be adjusted relatively to a stationary mark, or whether the arrangement is effected in the reverse manner, as may be seen correspondingly at 10' and 5' schematically in FIG. 6.

In connection with the embodiment of the automatic timing and aperture formation mechanism, the camera is provided, as shown similarly in the block circuit diagram according to FIG. 6, with a photo-electric converter, for example, a light-responsive photo-diode 15, for sensing ambient light. The light-dependent photoelectric current of such photo-electric converter, both in the exposure measurement phase and in the exposure control phase, advantageously serves to determine the prevailing brightness of the subject to be photographed, whereby to determine the proper relationship of the shutter speed and diaphragm aperture size parameters via the microcomputer 12 in conjunction with the adjustment means 5 or 10, one of which has been used for preselecting one corresponding such parameter. The photo-diode 15, in turn, has associated with it an operational amplifier 16 which suitably amplifies the photoelectric current in the usual manner.

Consideration of the sensitivity of the film in the camera is effected by means of a control 17, the setting value of which, once it has been adjusted, is stored in the microcomputer 12 or control circuit and influences the determination of the exposure time and aperture size in the well-known way.

Figure 2:
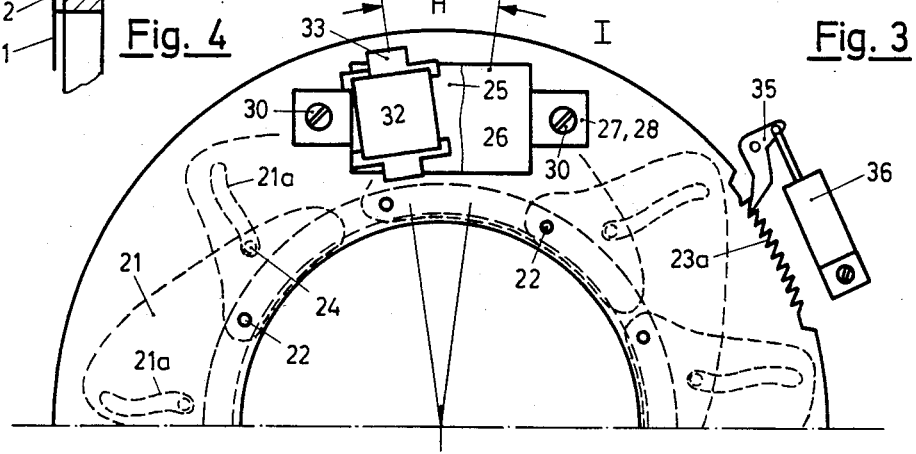
FIG. 2 is a schematic partial elevational view of an embodiment of the diaphragm system fitted in the lens assembly.

As shown in FIG. 2, the diaphragm system, indicated above in general by the designation B and provided on the lens assembly 2, has a base plate 20 on which a plurality of oscillatable diaphragm blades 21 is journalled to rotate on pins 22. The blades 21 open fully to allow the passage of light through the lens opening at the lens elements 3 of the assembly 2 so that, initially, the image is reflected by the mirror 6 into the view finder system 7 for the usual focusing purposes. However, the mirror returns to horizontal position out of the path of the film window and the diaphragm blades fully close once more when the shutter release button 8 is actuated, whereupon the desired focal plane shutter movement and proper diaphragm adjustment operation can in turn take place.

A cylindrical attachment 20a is formed on the base plate 20, on which attachment a ring 23, serving to actuate the diaphragm blades 21, is journalled to rotate. The ring 23 itself is provided with driving pins 24, each of which engages in a shaped slot 21a formed in the particular diaphragm blade 21 associated therewith.

Figure 4:
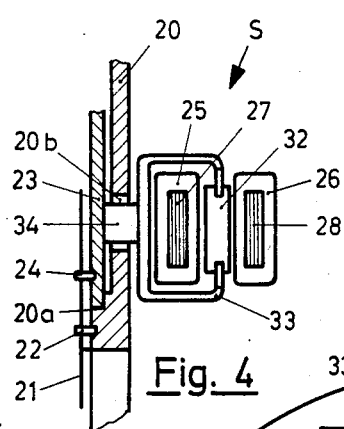
FIG. 4 is a schematic cross-sectional view of the drive unit taken along the line I—I of FIG. 3.
Figure 3:
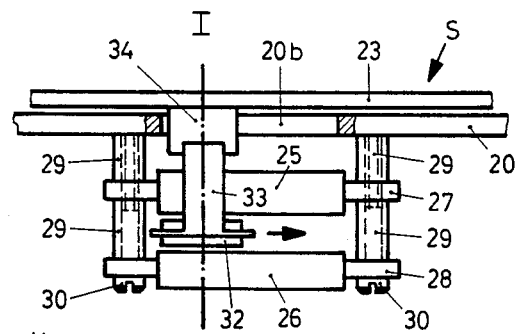
FIG. 3 is a schematic top plan view of the electrodynamic drive unit for driving the diaphragm system.

The diaphragm actuating ring 23 is driven electrically in known manner, under the influence of control means as constituted by control circuit 12a, for which purpose at least one, but preferably two or three electrodynamic drive units S in the usual coaxial tandem arrangement are used, the basic construction of only one of which is shown in FIGS. 2 to 4.

Essential components of such a drive unit or drive system S are two electromagnetic coils 25 and 26 disposed opposite to each other and located on magnetic closure segments or coils 27 and 28 extending parallel to each other. As shown in FIG. 3 the segments 27 and 28 are firmly connected to the base plate 20 by means of magnetically non-conductive spacer bushes 29 and screws 30 or the like.

Both magnet coils 25 and 26 are associated with at least one permanent magnet 32 which is held by a stirrup 33 made of magnetically non-conductive material and retained so that it can move along on angular or arcuate paths freely backwards and forwards between the magnetic coils 25 and 26. The stirrup 33, serving to retain the permanent magnet 32 and extending around the coil 25, is firmly connected to the actuating ring 23 by means of an intermediate member 34 which extends through an opening or slot 20b provided in the base plate 20.

If the current of the energy source (not shown) flows through the electro-magnetic coils 25 an 26, triggered by a pulse of the electronic control circuit 12a, the N-S polarized permanent magnet 32 is caused to move under the influence of the magnetic field produced in the magnetic coils 25 and 26. As a result, the rotable ring 23 and in turn the diaphragm blades 21 are moved out of their previous position into another position. By selecting the appropriate polority for the electromagnetic coils 25 and 26, both an opening or a closing movement may be provided in this manner.

If the stated movement is effected to product a certain aperture value (working, diaphragm aperture), either in dependence upon a manually preadjusted value or an aperture value automatically obtained in the electronic control circuit in dependence upon sensed ambient light conditions, the diaphragm blades 21 move from theclosed to the selectively sized open position.

However, the opening movement thereof, i.e. when the drive system 5 is automatically energized, can be prematurely ended before reaching the maximum open position by the pawl arm of a pivoted locking lever 35 dropping into a series of notches 23a provided, for example, on the circumference of the ring 23. This series of notches preferably is provided with a saw tooth or serrated shape and may be designed so that unilateral locking is effected only in the opening direction of the diaphragm system B, with the locking lever 35 readily yielding to movement of the notches 23a therepast in the closing direction of movement of the diaphragm blades 21 and ring 23. Thus, closing of the diaphragm can be effected without delay as soon as the closing drive comes into action, even if the magnetic lock has not been deactivated at this point in time.

The locking lever 35 is actuated by a lifting magnet 36, e.g. an electromagnetic device having a stationary coil and a movable pole armature in the usual way, such that the pole armature thereof engages the locking lever 35 by means of a lifting and thrust rod pivotally connected to the arm of the locking lever opposite the pawl arm thereof. The lifting magnet 36 is energized in turn by means of an output switch 37 suitably provided in the electronic control circuit 12a for this purpose.

As may also be seen from FIG. 6, an output switch 38 is connected in series with the electrodynamic drive unit S for driving the diaphragm system B automatically in accordance with the preset program selected for the control means or control circuit.

In this regard, in order to achieve an opening movement, the electromagnetic coils 25 and 26 are initially traversed by current in one direction, and, in order to obtain a closing movement, are subsequently traversed by current in the opposite direction after repolarizing, i.e. after reversing the polarization in the appropriate manner in the circuit 12a.

If the diaphragm system B effects merely a diaphragm function in cooperation with the focal plane shutter, the preselected stop position of the actuating ring 23 is retained, after the setting of the working diaphragm aperture, either manually or by automatic formation as the case may be, until the exposure process is terminated by the focal plane shutter.

If, on the other hand, in the taking of photographs using an electronic flash, as will be described in greater detail hereinafter, the diaphragm system B is used also for exposing the film material while the focal plane shutter remains open, i.e. where the diaphragm system serves as an active shutter system in addition to its actual diaphragm function and the focal plane shutter serves as a passive element in fully open, e.g. temporarily stationary, position, the ring 23 is moved automatically via the drive unit S out of the assumed or preselected size aperture stop position, after a short interval of only a few milliseconds, under the influence of the control circuit 12a, back to the starting or closed position.

The angular range of movement, i.e. relative to the optical axis of the lens system, made by the permanent magnet or magnets 32 is indicated in FIG. 1 by H. This range, of course, determines the corresponding range between the closed and maximum open position of the diaphragm 21 and in turn the size of the diphragm aperture between such limits. According to the embodiment shown, the aperture system B or the opening and closing system represented thereby, which only briefly exposes the light passage in the taking of photographs using flash, may be advantageously formed as a single oscillating blade system. If only one such blade system is used, the same being automatically controlled by the microcomputer 12 which energizes the drive unit 5 therefor, a function diagram according to FIG. 7 is obtained for such blade system as indicated by $B_1$, when photographs are taken using electronic flash and concomitantly having shorter exposure times than 1/125 sec.

However, the diaphragm system may also comprise two independently actuated counterpart blade sub-systems which are constructed and arranged in the same manner as the single diaphragm system $B_1$ but which are respectively separately energized by corresponding drive units automatically controlled by microcomputer 12. These sub-systems are indicated by $B_1'$ and $B_2$ in the function diagram of FIG. 8. Whereas one such blade sub-system $B_1'$, whose motion path is indicated by a full line in FIG. 8, opens the light passage, the other such blade system $B_2$, whose motion path is indicated by a chain-dotted line, serves both initially for the preformation of the working diaphragm aperture and subsequently for the complete closing thereof.

It will be appreciated that the drive of the second blade sub-system $B_2$ can be effected in the same manner as that of the first blade sub-system $B_1$ by means of one or more electrodynamic driving systems S' corresponding to the basic system S. One of these driving system S' is also indicated in broken lines, similarly having a switch 38' of the same type as switch 38 connected in series therewith, in regard to the control circuit 12a containing microcomputer 12 according to FIG. 6.

As the artisan will appreciate, the second blade in sub-system $B_2$ corresponds in structure to system B, as shown in FIGS. 2 to 4, with appropriate diaphragm blades journalled by pins to the camera base and driven by pins on a diaphragm setting ring, controlled by electromagnetic drive unit S' corresponding to unit S, and suitably arranged in conventional manner in coaxial alignment to blade system B and drive unit S in the lens assembly 2 as shown in FIG. 1, whereby to achieve in accordance with the present invention the operational concordance of diaphragm aperture formation and closure as depicted in FIG. 8, using the control circuit of FIG. 6. The corresponding intermediate member for the stirrup of the unit S' in this instance, will not only pass through an opening in base plate 20 but also a corresponding openign in the intermediate diaphragm ring to reach the ultimate diaphragm ring to be driven thereby, e.g. at a location diametrically opposed to the first unit S on the base plate 20.

Thus, as shown in FIG. 4a, a second electromagnetic drive unit S' corresponding to unit S, whose like parts are indicated by prime (') reference numerals, is provided at a location diametrically opposed to unit S on base plate 20, with its intermediate member 34' extending through slot 20b' of base plate 2 and slot 23b of ring 23 as well as through slot 20bb' of second base plate 20' and firmly connected to actuating ring 23' journalled to rotate on cylindrical attachment 20aa', so as to actuate diaphragm blades 21' of blade system $B_1'$ via driving pin 24' on ring 23' relative to pivot pins 22' which pivotally attach the blades 21' to base plate 20' in the same way as blades 21 of blade system $B_2$ are actuated per unit S (See FIG. 4). Naturally, the circumferential point of unit S' will be selected so that intermediate member 34' will be located in the fluted annular area between the outermost crest portions of two adjacent blades and thus outwardly beyond their range of movement (see FIG. 2).

FIG. 4b shows a similar arrangement to that of FIG. 4a, with like parts of the second sub-system $B_1'$ being indicated by double prime (") reference numerals, in which the base plate 20", actuating ring 23" and blades 21" of the second sub-system face the corresponding parts of the first sub-system $B_2$ so that the intermediate member 34" connected ot the corresponding drive unit (not shown) is firmly attached directly to the ring 23" which is in front of the base plate 20".

It is sufficiently well known that focal plane shutters having short exposure times less than 1/125 sec. and 1/60 sec., due to inherent design limitations as earlier discussed, are constructed or are adjusted to provide a focal plane shutter opening or slit which always exposes the film surface only in progressive incremental strips, corresponding to the moving opening or slit formed by the boundaries of the advanced and lagging curtain or slide portions of the composite shutter system as they individually move in tandem across the film window. Consequently, the film material is only exposed progressively in incremental sections during the continuous shutter movement.

However, for taking photographs with an electronic flash, whose effective illumination time is for instance of the order of magnitude of 1/1000 sec. as is well known focal plane shutters are simply not suitable. This is because, as aforesaid, the intended photograph requires the setting of a short exposure times, for example, an exposure time shorter than 1/125 sec. for a 35 mm camera, and such exposure is not possible or practical to achieve with known type focal plane shutter cameras, during their incrementally exposing continuous movement.

Electronic flash synchronization can only be achieved with a focal plane shutter if the picture window is fully exposed by the focal plane shutter at the precise moment of ignition of the electronic flash, as previously indicated. In the case of conventional cameras, this is possible only if the exposure time to which the camera is adjusted, is not shorter than 1/60 sec. or 1/125 sec., whereby to permit the advanced curtain or slide portion of the focal plane shutter system to travel completely past the film window to expose completely such window before the lagging curtain or slide portion thereof begins its travel across the film window to cover over or reclose the same.

This disadvantage, associated basically with focal plane shutter cameras, may be overcome, according to the present invention, in a surpringly simple and economical manner if the additional function of the opening and closing of the light passage, under the influence of conjoint control means, is transferred to the diaphragm blade system fitted in the lens and which otherwise normally only performs an aperture function, when taking photographs with an electronic flash which require expose times shorter than 1/125 sec. and 1/60 sec.

For this purpose, the program structure of the microcomputer 12 associated with the electronic control circuit 12a is selected so that, when the camera is changed over to "FLASH" or "⚡" type of operation and adjusted by adjustment means such as selector 40 as later described to an exposure time shorter than 1/125 sec. or 1/60 sec., then after the triggering of the camera via release button 8, the focal plane shutter on the camera completely opens the film window for a specified predetermined interval of time, during which the film material is automatically exposed by the diaphragm blade system on the lens assembly acting as the shutter system for a preselected interim time synchronized with the ignition of the electronic flash, all under the influence of the control circuit 12a.

The effective illumination time of the electronic flash may be generally of the order of magnitude of 1/1000 sec., the exposure time of the diaphragm blade system may be as short as 1/125, 1/200, 1/250 or 1/500 sec., as desired, and the time the focal plane shutter remains in fully open position may be any desired longer interval, e.g. 1/60 sec. to 1 sec. or even longer.

With all other electronic flash photographs using an exposure time longer than the above-mentioned limit values, the exposure of the film material may be effected, as before, by the focal plane shutter as the shutter system and with the diaphragm blade system 21 on the lens assembly merely serving to provide the working diaphragm aperture in the normal manner.

As far as the control of the working diaphragm aperture as such is concerned, this will preferably always be effected by an appropriate magnetic lock system 35, 36 independently of whether one diaphragm blade system or two counterpart diaphragm blade sub-systems are employed, or of whether, as is the case with the shortest electronic flash type photographs when the diaphragm serves both a shutter function and a working aperture sizing function, the time formation proceeds simultaneously with the diaphragm formation, or not.

Accordingly, the magnet lock system 35, 36 may act either directly, as may eb seen from FIG. 2, on the actuating ring 23, or alternatively in suitable manner indirectly on a control member used for operating the particular diaphragm, as desired.

With the use of a single oscillating diaphragm blade system, the switching off of the electrodynamic drive via the control circuit 12a will preferably be effected, at the latest upon reaching of the working diaphragm aperture, and thus at a point in time which coincides synchronously with the effective actuation of the magnetic lock system 35, 36. From the point of view of control, this may be achieved by suitable programing of the microcomputer 12 present in the electronic control circuit in a simple and well known manner, whether the diaphragm system is used merely to predetermine the aperture size or to act as a shutter system as well.

In certain circumstances, the electrodynamic drive for the blade system may be switched off before the magnetic lock system 35, 36 comes into action, since the high initial accerlation of the diaphragm blades, due to the electrodynamic drive system, may be sufficient to produce a steep opening flank or slope in terms of the blade travel per unit time ratio considering the knetic inertia of the moving ring 23, permanent magnet 32 ad diaphragm blades 21. The most favorable swith-off point generally has to be predetermined empirically, in dependence upon the movement characteristic of the blade system which is used, as the artisan will appreciate.

According to FIG. 1, in the case of the above-described ambient light-responsive computer-controlled single lens reflex camera, such camera may suitably be provided with various setting positions for different types of operation. These may be briefly described in connection with their particular specific type of exposure, as follows:

"AUTO 1"—Automatic setting of exposure time of focal plane shutter with manual preselection of diaphragm working aperture size;

"AUTO 2"—Automatic setting of diaphragm working aperture size with manual preselection of exposure time of focal plane shutter, the diaphragm blades being automatically electrodynamically actuated via the control means for forming the diaphragm working aperture;

"MAN"—Manual selection of comparatively long exposure time of focal plane shutter with appropriate concordant selection of diaphragm working aperture;

"FLASH" or "⚡"—Short exposure time, e.g. 1/200 sec. or shorter, for electronic flash synchronization, using the electrodynamically driven diaphragm blade system on the lens assembly as the shutter system as well as the aperture sizing element according to the invention.

The setting or change-over of the camera to one of the above listed positions is effected by means of adjustment means, e.g. in the form of selector means such as the selector 40 which may be conveniently constructed, for example, as a double-armed rotatably journalled setting lever and provided on one lever arm with a grip 40a.

With the selector 40 in the "MAN" position, flash synchronization for comparatively long exposures as far over as the position "B" is also possible with the use of the focal plane shutter, as contemplated herein, e.g. with concordant appropriate preselection of the diaphragm aperture size.

The formation and arrangement of the selector 40, preferably journalled to rotate concentrically to the cylindrical casing 11, may be suth that it has a pointer-like end on such one lever arm extending out of the casing and carrying grip 40a which can be manually gripped for movement to a desired setting position.

Appropriate pairs of switch contacts 41, which are connected via corresponding pairs of electrical leads 42 to the microcomputer 12, are associated with the other lever arm of the selector 40, as may be seen from FIG. 6. The selector 40, in turn, is provided with a contact plate 40b on its end facing the switch contacts 41. The plate 40b consists of electrically conductive material, and establishes contact between the two leads 42 associated with a particular setting position, as the selector 40 is rotated from one position to the next.

When the selector 40 is at one of the setting positions the program, associated with this setting and stored in the microcomputer 12 in the usual way, is fed to the electronic control circuit which then, after the camera is operated automatically as triggered by pressing the shutter release button 8, controls the function thereof according to the received program data for correct exposure of the film material, i.e. in terms of the related exposure time and diaphragm aperture size parameters.

With respect to the embodiment shown in FIGS. 5 and 6, using a focal plane shutter camera according to the present invention, it is possible to provide, in addition to the abovementioned types of operation "AUTO 1", "AUTO 2", and "MAN" a further type "AUTO 3" and a "FLASH" or "⚡" range which s divided into a plurality of setting sub-position with specifically associated predetermined exposure times, for example, 1/125 sec., 1/250 sec. and 1/500 sec.

In this regard, in the corresponding programming of the microcomputer 12

"AUTO 3"—signifies automatic shutter speed exposure timing by means of the diaphragm blade system as the shutter system whereby flash synchronization to 1/125 sec. or 1/500 sec. is made possible for "flash fill-in technique" when taking "automatic daylight photographs." (As contemplated herein, "fill-in technique" or flash complemented photography means that the flash is used for taking flash assisted daylight or ambient light photographs particularly for brightening shaded parts of the already lighted area to be photographed).

The dividing up of the "flash" or "⚡" range accordingly offers the camera user several selection possibilities for electronic flash synchronization when taking flash photographs using very short exposure times whereby to obtain specific effects as desired in the taking of such photographs, i.e. while the focal plane shutter remains in fully open position throughout.

The arrangement of the electronic control circuit and electronic flash are, as already known from the design of modern single lens reflex cameras, basically provided on the camera, whereas the drive for the blades of the diaphragm system is normally located in the interchangeable lens assembly. Consequently, steps have to be taken to establish a functional connection between the circuit and the blade drive when the interchangeable lens is attached to the camera. This operative interconnection, especially with the use of an electrodynamic drive for the diaphragm blades may be readily effected by means of conventional pin or sping contacts (not shown) on the corresponding parts coming into action automatically, in the usual way, upon attachment of the interchangeable lens assembly onto the camera, as the artisan will appreciate.

Although such control and diaphragm drive systems are well known, it will be appreciated that they are arranged in accordance with the present invention, along with the electronic flash, focal plane shutter and diaphragm blade systems, in cooperating coaction, under the influence of adjustment means for concordant selection of the size of the working aperture and duration of the brief interval of exposure time for achieving synchronized flash ignition with the diaphragm blade shutter operation while the focal plane shutter remains open throughout. Thus, upon pressing the shutter release button 8, after the adjustment means including selector 40 have been set, the control circuit 12a responsive to the action of button 8 is triggered, and automatically the mirror 6 is raised away from the film window, whereupon under the influence of the microcomputer 12 the diaphragm system starts its action, the focal plane shutter moves to open position, the diaphragm system achieves exposure position and the flash is synchronously ignited, the diaphragm system completes its closing action and the focal plane shutter moves to reclosure position, so that the mirror can return to its lowered reflex viewing position.

In the embodiment described above and also illustrated in the drawings, electrodynamic driving systems S and S' are provided for the drive of the diaphragm blades 21, as the case may be. However, the actuation device for the diaphragm blades 21 is not restricted to the use of such a form of drive. On the contrary, it may also be fashioned as a corresponding spring drive system, but with the latter type of drive, greater mechanical sophistication has to be provided, involving poorer flexibility of control, than is otherwise the case with the use of an electrodynamic drive.

It will be appreciated that the pair of electrodynamic drive units, S and S' and corresponding blade systems $B_1'$ and $B_2$ may be provided, for instance, in the same manner as in the case of the analogous pair of electromagnetic drive units for the pair of blade systems shown in copending U.S. application Ser. No. 52,281, filed June 26, 1979, for independent actuation in concordant sequence for achieving in dependence upon the control circuit the desired aperture formation and shutter operation in question.

Referring to FIG. 7, in accordance with one selective mode of sequential operation, upon pressing shutter release button 8, mirror 6 is automatically moved by known means in the usual manner from its inclined reflex viewing position used for prefocusing purposes to its horizontal position out of the light extending path through the optical axis from the lens elements 3 to the film window; then the diaphragm blade system $B_1$ is automatically moved by the drive system S according to the preselected program of the microcomputer 12 in the control circuit 12a as triggered in response to actuation of button 8 and as adjusted by the selector 40 at the particular flash position selected, firstly, from fully open basic position to fully closed position; and then the focal plane shutter is automatically moved by known means in the usual manner (following movement of the mirror 6) to fully open position according to the shutter speed selected therefor, e.g. simultaneously preselected by movement of selector 40 to such flash position or by preselected adjustment of knob 10 to 1/60 sec. to 1 sec. or to the "B" setting, but in any case for a delay time interval in fully open position of substantially longer than the actual exposure time selected, i.e. longer than 1/125 to 1/500 sec., as the case may be.

Next, the diaphragm blade system $B_1$ acting in its combined role as a diaphragm working aperture formation system and an opening shutter system is automatically moved, secondly, from the fully closed position to open position to the extent necessary to form the diaphragm working aperture of preselected size concordant with the exposure time parameter at the light intensity of the electronic flash being used; simultaneously of the desired size working aperture the electronic flash is automatically ignited by known means in the usual manner according to such preselected program, whereby to permit the flash light which may have an effective illumination time for instance of the order of magnitude of 1/100 sec. to pass through the selectively sized now open diaphragm working aperture and the still constantly fully open focal plane shutter, so as to reach the film material at the film window; and then the diaphragm blade system $B_1$ acting in its role as a closing shutter system is automatically, thirdly, moved back to fully closed position to complete the electronic flash exposure sequence of the program.

The focal plane shutter, which is set at an operating speed significantly slower than the exposure speed of the diaphragm system $B_1$, in turn is automatically moved after its delay time interval in fully open position back to closed position, after which the mirror 6 returns automatically to its inclined viewing position in the usual way following focal plane shutter reclosure movement. The reopening movement of the diaphragm system $B_1$ back to fully open basic position, which is effected automatically, fourthly, at this point by the drive system S in accordance with the terminal program of the control system, safely occurs after the film window has again been covered by the focal plane shutter. The focal plane shutter and camera can thereafter be reset for taking the next photograph in the usual manner.

Referring to Fig. 8, a corresponding mode of sequential operation is obtainable as in the embodiment shown in FIG. 7, except that the control circuit is programmed to energize the drive systems 5 and 5' independently and in proper selective sequence and direction via the switches 38 and 38' to move automatically the diaphragm blade systems $B_1'$ and $B_2$ (system $B_1$; being in effect the same system as system $B_1$ in structure and system $B_2$ being a like repeat thereof independently energized according to the program of the microcomputer 12, (whereby to achieve the desired results.

More specifically, after the above stated triggering actuation of shutter release button 8, and initiation of movement of mirror 6, firstly, blade systems $B_1'$ is automatically moved from fully open position to fully closed position; then blade system $B_2$ is automatically moved, firstly, from fully open position to an intermediate open position to the extent necessary to form the diaphragm working aperture of preselected size concordant with the exposure time parameter at the light intensity of the electronic flash being used; and then the focal plane shutter automatically is moved to fully open position for the above stated delay time interval.

Next, the blade system $B_1'$ acting in its separate role as opening shutter system is automatically moved, secondly, from fully closed position back to fully open position; simultaneously or synchronously with the initial achievement of the formation of the desired size working aperture in relation to ambient light, i.e. as the opening movement of blade system $B_1'$ completes its uncovering of the selectively sized preformed working aperture of the initially opened blade system $B_2$, the electronic flash is automatically ignited according to the above stated preselected program, whereby to permit the flash light to pass through the now fully open blade system $B_1'$, the working aperture of the blade system $B_2$ acting in its initial separate role as a diaphragm aperture formation system, and the still constantly fully open focal plane shutter, so as to react the film material at the film window; and then the blade system $B_2$ acting in its subsequent separate role as a closing shutter system is automatically moved, secondly, further to fully closed position to complete the electronic flash exposure sequence of the program.

The focal plane shutter which is set at an operating speed significantly slower than the exposure speed composite interval between the shutter opening movement of the blade system $B_1'$ and the shutter closing movement of the blade system $B_2$, in turn is automatically moved after its delay time interval in fully open position back to closed position, after which the above stated return movement of mirror 6 is effected. The reopening movement of the blade system $B_2$, which is effected automatically, thirdly, at this point by the drive system S' in accordance with the above stated terminal program of the control system, safely occurs after the film window has again been covered by the focal plane shutter. As above stated, the focal plane shutter and camera can thereafter be reset for taking the next photograph.

FIG. 7 clearly shows the critical flash ignition only occurs after the diaphragm system B has completed its aperture formation movement and has reached its stationary aperture formation open position, i.e. for completion of the flash ignition during the brief interval of exposure time, whereby the shutter reclosure action of the diaphragm system is able to be effected readily and precisely in rapid manner after such ignition and at the exact end of the short exposure interval selected. Analogously, FIG. 8 clearly shows that the critical flash ignition only occurs after the blade system $B_2$ has completed its aperture formation movement and has reached its stationary aperture formation open position and also after the blade system $B_1'$ has completed its opening shutter movement at least to the extent of completely uncovering the opening in the blade system B₂, i.e. for completion of the flash ignition during the corresponding brief interval of exposure time, whereby the shutter reclosure action of the blade system B₂ is able to be effected readily and precisely in rapid manner after such ignition and at the exact end of the inherently even shorter possible exposure interval which may be selected therewith.

In review, the present invention advantageously contemplates a camera for taking photographs using an electronic flash of the conventional type having a film window at which the film material is locatable, a focal plane shutter movable from an initial closed position to a completely open interim position and thence to a subsequent closed positioned at the film window, and a lens assembly therefor provided with a lens opening and incorporating an aperture forming diaphragm system movable in the usual manner between a closed diaphragm position and an open diaphragm position of selectively sized working aperture at the lens opening.

The lens assembly may be suitably provided as an interchangeable unit. The electronic flash system, of course, may be either incorporated on the camera or be a detachable add-on unit, both types being conventional. Preferably, the camera itself is a single lens reflex camera.

Such camera is specifically modified in accordance with the present invention by the inclusion thereon of control means for controlling the diaphragm system and the ignition of the electronic flash, i.e. which control means are operable when taking photographs using an electronic flash and after the focal plane shutter has been moved to completely open interim position for complete exposure of the film window thereat and before the start of the focal plane shutter movement to the subsequent closed position.

The control means in essence are operable sequentially for effecting corresponding interim movement of the diaphragm system to an open position of selectively sized working aperture at the lens opening to expose the film material locatable at the film window for a selectively brief interval of exposure time through the lens opening or objective aperture and thereafter back to the closed diaphragm position, and also for synchronizing the ignition of the electronic flash with the achievement or initial completion of the reaching or formation of the open position selectively sized working aperture, whereby to take a flash photograph during such brief interval of exposure time.

The control means specifically contemplate adjustment means for selectively varying the size of the working aperture and the duration of the brief interval of exposure time, as the artisan will appreciate.

Preferably, an electrodynamic or electromagnetic drive is provided for moving the diaphragm system. The diaphragm system itself may comprise a single oscillatable diaphragm blade system, or the lens assembly may optionally be of the type having a diaphragm system which includes two separate oscillatable diaphragm blade counterpart sub-systems actuable independently of each other. In the latter case, one of the blade sub-systems is used for opening the diaphragm system at the start of the brief interval and the other blade sub-system is used for preforming the selectively sized working aperture prior to opening actuation of such one blade sub-system and for closing the diaphragm system at the end of the interval of exposure time, while the control means control the nature, sequence, duration and extent actuation of such sub-systems.

Suitably, the control means include an electronic control circuit for controlling the energization of the electromagnetic drive in dependence upon the adjustment of the adjustment means as well as for synchronizing the ignition of the electronic flash in dependence upon or in conjunction with such electromagnetic drive energization. The electronic circuit desirably includes light responsive means for sensing ambient light and selector means for switching among a number of individual operative positions. Such positions preferably contemplate a flash position for effecting the stated movement of the diaphragm system, as to both extent and timing duration, and for synchronizing the stated ignition of the electronic flash, as well as a plurality of positions for taking daylight photographs with the focal plane shutter.

As to the latter positions, these include corresponding automatic positions for automatic setting respectively of the focal plane shutter exposure time and of the diaphragm working aperture size in dependence upon the ambient light sensed by the light sensitive means with concordant preselection respectively of the diaphragm working aperture size and of the focal plane shutter exposure time, as the case may be, and a manual position for manual selection of the focal plane shutter exposure time with appropriate concordant selection of the diaphragm working aperture size.

On the other hand, the flash position may in fact comprise a plurality of sub-positions for preselecting the duration of the brief interval of exposure time from among a corresponding plurality of individual preset specific exposure times such as 1/125 sec., 1/250 sec. and 1/500 sec. exposure times, and concomitantly the extent of diaphragm blade movement for achieving the size of aperture opening selected.

Moreover, the selector means may contemplate the provision of a further flash assisted automatic position for taking flash complemented daylight photographs with automatic setting of the brief interval of exposure time of the diaphragm system in dependence upon the ambient light sensed by the light responsive means and conjoint synchronized flash ignition, e.g. with concomitant automatic setting or manual preselection of the size of the diaphragm working aperture, as the case may be, all while the focal plane shutter remains in fully open position throughout.

The present invention also advantageously contemplates a method for taking photographs using an electronic flash with a camera having the foregoing structural aspects and stated components.

Such method contemplates sequentially setting the camera for electronic flash operation with loaded film material located at the film window, moving the focal plane shutter to or setting the same at completely open interim position for complete exposure of the film window thereat, effecting corresponding interim movement of the diaphragm system to an open position of selectively sized working aperture at the lens opening to expose the film material located at the film window for a selectively brief interval of exposure time through the lens opening, i.e. after the focal plane shutter has been moved to completely open interim position, effecting electronic flash ignition in synchronization with the achievement or initial completion of the reaching or formation of the open position selectively sized working aperture of the diaphragm system, and thereafter effecting movement of the diaphragm system back to the closed diaphragm position, before the start of the focal plane shutter movement to subsequent closed position, whereby to take a flash photograph during such brief interval of exposure time and while the focal plane shutter remains in fully open position throughout.

Desirably, the diaphragm aperature may be opened in this manner for a very brief interval of exposure time with excellent results, e.g. an exposure time of at most about 1/125 sec., of even shorter, e.g. 1/250 sec. or 1/500 sec.

It will be appreciated that the foregoing specification and drawings are set forth by way of illustration and not limitation, and that various modifications and changes may be made therein without departing from the spirit and scope of the present invention which is to be limited solely by the scope of the appended claims.

What is claimed is:

1. Camera for taking photographs using an electronic flash, of the type having a film window at which the film material is locatable, and a focal plane shutter movable from an initial closed position to a completely open position at the film window, comprising
    a lens assembly therefor provided with a lens opening and incorporating an aperture forming diaphragm system movable between a closed diaphragm position and an open diaphragm position of selectively variably sized working aperture at the lens opening, and
    control means, operatable when taking photographs using an electronic flash and after the focal plane shutter has been moved to completely open position for complete exposure of the film window thereat, and arranged for cooperating coaction sequentially
    for effecting interim movement of the diaphragm system to an open position of selectively variably sized working aperture at the lens opening to expose the film material locatable at the film window for a selectively brief interval of exposure time through the lens opening and thereafter back to the closed diaphragm position, while the focal plane shutter remains at completely open position, and
    for synchronizing the ignition of the electronic flash with the initial achievement of the open position selectively variably sized working aperture for completion of the flash ignition during such brief interval of exposure time and prior to movement of the diaphragm system back to the closed diaphragm position and also prior to movement of the focal plane shutter back to the initial closed position,
    whereby to take a flash photograph during such brief interval of exposure time.

2. Camera of claim 1 wherein the control means include adjustment means for selectively varying the size of the working aperture and the duration of such brief interval of exposure time.

3. Camera of claim 1 wherein an electromagnetic drive is provided for moving the diaphragm system.

4. Camera of claim 1 wherein
    an electromagnetic drive is provided for moving the diaphragm system, and
    the diaphragm system includes a single oscillatable diaphragm blade system.

5. Camera of claim 1 wherein
    an electromagnetic drive is provided for moving the diaphragm system, and
    the lens assembly is of the type having a diaphragm system which includes two separate oscillatable diaphragm blade counterpart sub-systems actuable independently of each other, one of which is used for opening the diaphragm system at the start of such brief interval of exposure time and the other of which is used for preforming the selectively sized working aperture prior to opening actuation of said one blade sub-system and for closing the diaphragm system at the end of such brief interval of exposure time, and
    the control means control the sequence and extent of actuation of such sub-systems.

6. Camera of claim 1 wherein
    an electromagnetic drive is provided for moving the diaphragm system, and
    the control means include adjustment means for selectively varying the size of the working aperture and the duration of such brief interval of exposure time.

7. Camera of claim 6 wherein the control means include an electronic circuit for controlling the energization of the electromagnetic drive in dependence upon the adjustment of the adjustment means and for synchronizing the ignition of the electronic flash in conjunction with such electromagnetic drive energization.

8. Camera of claim 7 wherein the control circuit includes light responsive means for sensing ambient light and selector means for switching among a number of individual operating positions including
    a flash position for effecting said movement of the diaphragm system and for synchronization said ignition of the electronic flash, and
    a plurality of positions for taking daylight photographs with the focal plane shutter including corresponding automatic positions for automatic setting respectively of the focal plane shutter exposure time and of the diaphragm working aperture size in dependence upon the ambient light sensed by the light responsive means with concordant preselection respectively of the diaphragm working aperture size and of the focal plane shutter exposure time, and
    a manual position for manual selection of the focal plane shutter exposure time with concordant selection of the diaphragm working aperture size.

9. Camera of claim 8 wherein the flash position includes a plurality of sub-positions for preselecting the duration of the brief interval of exposure time from among a corresponding plurality of individual preset specific exposure times.

10. Camera of claim 9 wherein such preset exposure times include 1/125 sec., 1/250 sec. and 1/500 sec. exposure times.

11. Camera of claim 9 wherein a further flash assisted automatic position is provided for taking flash complemented daylight photographs with automatic setting of the brief interval of exposure time of the diaphragm system in dependence upon the ambient light sensed by the light responsive means and conjoint synchronized flash ignition.

12. Camera of claim 1 wherein the camera is a single lens reflex camera.

13. Method for taking photographs using an electronic flash with a camera of the type having a film window at which the film material is locatable, a focal plane shutter movable from an initial closed position to a completely open position at the film window, and means, operatable when taking photographs using an electronic flash and after the focal plane shutter has been moved to completely open position for complete exposure of the film window thereat, and arranged for cooperating coaction sequentially for effecting interim movement of the diaphragm system to an open position of selectively variably sized working aperture at the lens opening to expose the film material locatable at the film window for a selectively brief interval of exposure time through the lens opening and thereafter back to the closed diaphragm position, while the focal plane shutter remains at completely open position, and for the ignition of the electronic flash, which comprises setting the camera for electronic flash operation with loaded film material located at the film window, moving the focal plane shutter to completely open position for complete exposure of the film window thereat, effecting corresponding interim movement of the diaphragm system to an open position of selectively variably sized working aperture at the lens opening to expose the film material locatable at the film window for a selectively brief interval of exposure time through the lens opening, after the focal plane shutter has been moved to completely open position, effecting electronic flash ignition in synchronization with the initial achievement of the open position selectively variably sized working aperture of the diaphragm system for completion of the flash ignition during such brief interval of exposure time, and thereafter effecting movement of the diaphragm system back to the closed diaphragm position, while the focal plane shutter remains at completely open position, whereby to take a flash photograph during such brief interval of exposure time.

14. Method for taking photographs using an electronic flash with a camera of the type having:

a film window at which the film material is locatable and a focal plane shutter movable from an initial closed position to a completely open position at the film window and further having:

a lens assembly provided with a lens opening and incorporating an aperture-forming diaphragm system movable between a closed diaphragm position and an open diaphragm position of selectively variably sized working aperture at the lens opening and;

control means, operatable when taking photographs using an electronic flash, which is arranged for cooperative coaction sequentially to effect interim movement of the diaphragm system and which synchronizes the ignition of the electronic flash with the open position of the diaphragm which comprises:

setting the camera for electronic flash operation with loaded film material located at the film window;

moving the focal plane shutter to completely open position for complete exposure of the film window;

effecting corresponding interim movement of the diaphragm system to an open position of selectively variably sized working aperture at the lens opening to expose the film material located at the film window for a selectively brief interval of exposure time through the lens opening, after the focal plane shutter has been moved to completely open position;

effecting electronic flash ignition in synchronization with the initial achievement of the open position of the selectively variably sized working aperture of the diaphragm system for completion of the flash ignition during such brief interval of exposure time, and;

thereafter effecting movement of the diaphragm system back to the closed diaphragm position, while the focal plane shutter remains at completely open position, whereby to take a flash photograph during such brief interval of exposure time.

15. Method of claim 14 wherein the diaphragm aperture is opened for a brief interval of exposure time of at most about 1/125 sec.

16. Method of claim 14 wherein the camera is a single lens reflex camera.

* * * * *